US009804047B2

(12) United States Patent
Pagani et al.

(10) Patent No.: US 9,804,047 B2
(45) Date of Patent: Oct. 31, 2017

(54) INTEGRATED PRESSURE SENSOR WITH DOUBLE MEASURING SCALE, PRESSURE MEASURING DEVICE INCLUDING THE INTEGRATED PRESSURE SENSOR, BRAKING SYSTEM, AND METHOD OF MEASURING A PRESSURE USING THE INTEGRATED PRESSURE SENSOR

(71) Applicant: STMICROELECTRONICS S.R.L., Agrate Brianza (IT)

(72) Inventors: Alberto Pagani, Nova Milanese (IT); Bruno Murari, Monza (IT); Marco Ferrera, Concorezzo (IT); Domenico Giusti, Monza (IT); Daniele Caltabiano, Agrate Brianza (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 108 days.

(21) Appl. No.: 14/989,709

(22) Filed: Jan. 6, 2016

(65) Prior Publication Data
US 2016/0349129 A1    Dec. 1, 2016

(30) Foreign Application Priority Data
May 27, 2015 (IT) .................. 102015000018354

(51) Int. Cl.
*G01L 9/06* (2006.01)
*G01L 9/00* (2006.01)
*G01L 15/00* (2006.01)

(52) U.S. Cl.
CPC .......... *G01L 9/0052* (2013.01); *G01L 9/0054* (2013.01); *G01L 15/00* (2013.01)

(58) Field of Classification Search
None
See application file for complete search history.

(56) References Cited

U.S. PATENT DOCUMENTS

| 5,773,728 | A  | 6/1998  | Tsukada et al. |
|-----------|----|---------|----------------|
| 6,595,063 | B1 | 7/2003  | Rogne et al.   |
| 7,578,196 | B2 | 8/2009  | Riccoti et al. |
| 8,024,977 | B2 | 9/2011  | Murari et al.  |
| 8,173,513 | B2 | 5/2012  | Villa et al.   |
| 8,575,710 | B2 | 11/2013 | Villa et al.   |

(Continued)

FOREIGN PATENT DOCUMENTS

DE    196 17 286 C1    10/1997

*Primary Examiner* — Andre Allen
(74) *Attorney, Agent, or Firm* — Seed IP Law Group LLP (57) ABSTRACT

A pressure sensor with double measuring scale includes: a flexible body designed to undergo deflection as a function of a the pressure; piezoresistive transducers for detecting the deflection; a first focusing region designed to concentrate, during a first operating condition, a first value of the pressure in a first portion of the flexible body so as to generate a deflection of the first portion of the flexible body; and a second focusing region designed to concentrate, during a second operating condition, a second value of said pressure in a second portion of the flexible body so as to generate a deflection of the second portion of the flexible body. The piezoresistive transducers correlate the deflection of the first portion of the flexible body to the first pressure value and the deflection of the second portion of the flexible body to the second pressure value.

23 Claims, 8 Drawing Sheets

(56) References Cited

U.S. PATENT DOCUMENTS

| | | |
|---|---|---|
| 2003/0107095 A1 | 6/2003 | Kurtz |
| 2008/0178691 A1 | 7/2008 | Zhang et al. |
| 2008/0208425 A1 | 8/2008 | Riccoti et al. |
| 2008/0223143 A1* | 9/2008 | Murari .................... G01L 1/02 73/727 |
| 2011/0040206 A1 | 2/2011 | Burger et al. |
| 2016/0341622 A1* | 11/2016 | Mensa ................ C07F 9/65586 |

* cited by examiner

ID PRESSURE SENSOR WITH
DOUBLE MEASURING SCALE, PRESSURE
MEASURING DEVICE INCLUDING THE
INTEGRATED PRESSURE SENSOR,
BRAKING SYSTEM, AND METHOD OF
MEASURING A PRESSURE USING THE
INTEGRATED PRESSURE SENSOR

BACKGROUND

Technical Field

The present disclosure relates to an integrated pressure sensor with double measuring scale, to a pressure measuring device including the integrated pressure sensor, to a braking system, and to a method of measuring a pressure that uses the integrated pressure sensor. In particular, the ensuing treatment will make explicit reference, without this implying any loss of generality, to use of said pressure sensor in a braking system of a vehicle, in particular an electromechanical braking system of the BbW (Brake-by-Wire) type.

Description of the Related Art

As is known, disk-brake systems of a traditional type for vehicles comprise a disk fixed with respect to a respective wheel of the vehicle, a calliper associated with the disk, and a hydraulic control circuit. The calliper houses within it pads of friction material, and one or more pistons connected to the hydraulic control circuit. Following upon an action, exerted by a user of the vehicle, on the brake pedal, a pump in the hydraulic control circuit pressurizes a fluid contained in the circuit itself. Consequently, the pistons, equipped with purposely provided sealing elements, come out of respective seats and come to press the pads against the surface of the disk, in this way exerting a braking action on the wheel.

Recently, so-called DbW (Drive-by-Wire) systems have been proposed, which envisage electronic control of the main functions of a vehicle, for example the steering system, the clutch, and the braking system. In particular, electronically controlled braking systems have been proposed, which envisage replacement of the hydraulic callipers with actuators of an electromechanical type. In detail, appropriate sensors detect operation of the brake pedal and generate corresponding electrical signals, which are received and interpreted by an electronic control unit. The electronic control unit then controls intervention of the electromechanical actuators (for example, pistons driven by an electric motor), which exert the braking action on the corresponding brake disks, through the pads. The electronic control unit further receives from sensors associated to the braking system information on the braking action exerted by the electromechanical actuators so as to provide an appropriate closed-loop feedback control, for example, via a PID (Proportional-Integral-Derivative) controller. In particular, the electronic control unit receives information on the pressure exerted by each actuator on the respective brake disk.

To measure the aforesaid pressure, pressure sensors are used with high sensitivity both at low pressures and at high pressures, and likewise with a high full-scale value. In fact, there is particularly felt the need to measure pressure with a double measuring scale in order to measure both low pressures and high pressures with high precision. Furthermore, the force with which the pads are pressed against the disk may assume values from 0 N up to a maximum comprised in the range 10,000 to 35,000 N, according to the braking system.

There are currently known sensors capable of measuring high pressure values, which are made with a steel core, fixed on which are strain-gauge elements.

The strain-gauge elements detect the geometrical deformation of the core to which they are associated by variations of electrical resistance. However, these sensors, for reasons of reliability, size, and costs may be applied and used only for characterization and development of a braking system of the type described previously, but not in the production stage. Furthermore, they do not have a high precision and have only one measuring scale.

Likewise known are integrated pressure sensors, obtained with semiconductor technology. These sensors typically comprise a thin membrane suspended over a cavity made in a silicon body. Diffused within the membrane are piezoresistive elements connected together to form a Wheatstone bridge. When subjected to a pressure, the membrane undergoes deformation, causing a variation of resistance of the piezoresistive elements, and thus an unbalancing of the Wheatstone bridge. However, such sensors may not be used for measurement of high pressures, in so far as they have low full-scale values (namely, in the region of 10 kg/cm$^2$), in particular considerably lower than the pressure values that are generated in the braking systems described previously.

A solution to the aforementioned problems is disclosed by U.S. Pat. No. 7,578,196, where, for measurement of high pressures, a membrane sensor is proposed provided with first piezoresistive elements, set in the proximity of the membrane, and second piezoresistive elements, set at a distance from the membrane, in a bulk area that is solid and compact. The first piezoresistive elements are designed to detect a deflection of the membrane that undergoes deformation under the action of low pressures, until a maximum deflection (saturation) is reached. The second piezoresistive elements are designed to detect a stress of a transverse type (but not longitudinal, in so far as there is no bending or phenomena of curving of the bulk area) that acts on the second piezoresistive elements as a result of an increase in pressure beyond the saturation pressure of the membrane.

This type of sensor provides a good accuracy of measurement at low pressures (signal supplied by the first piezoresistive elements), but a poor accuracy at high pressures (signal supplied by the second piezoresistive elements). Furthermore, this type of sensor does not discriminate between pressure variations lower than a minimum detection threshold.

For the feedback-control system of the braking system to function optimally, it is expedient also for the measurements made at high pressures to be accurate and sensitive to minimal pressure variations.

BRIEF SUMMARY

Some embodiments of the present disclosure are a pressure sensor, a pressure measuring device, including the integrated pressure sensor, and a method of measuring a pressure that uses the pressure sensor which will enable the aforementioned disadvantages and problems to be overcome and in particular will present a double measuring scale, a high full-scale value, and high accuracy and sensitivity, so as to measure both high pressures and low pressures with a good level of precision.

According to the present disclosure, an integrated pressure sensor with double measuring scale, a pressure measuring device including the integrated pressure sensor, a braking system, and a method of measuring a pressure that uses the integrated pressure sensor are consequently provided as defined in the annexed claims.

BRIEF DESCRIPTION OF THE SEVERAL VIEWS OF THE DRAWINGS

For a better understanding of the present disclosure, preferred embodiments thereof are now described, purely by way of non-limiting example and with reference to the attached drawings, wherein.

DETAILED DESCRIPTION

Figure 1:
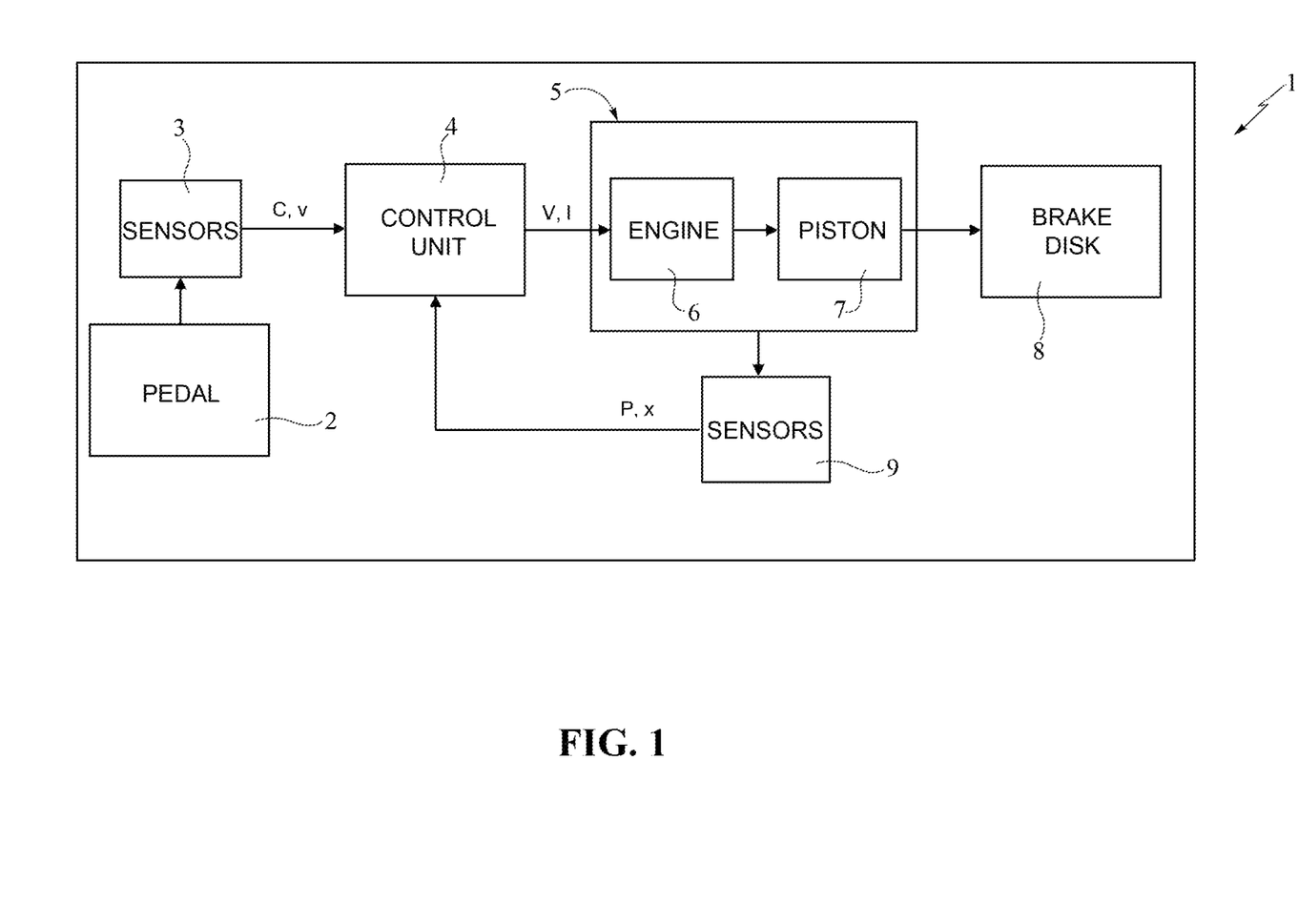
FIG. 1 illustrates a block diagram of a braking system of a brake-by-wire electromechanical type.

FIG. 1 shows an example of block diagram of a braking system 1 of an electromechanical type (a so-called "brake-by-wire" system), comprising: a brake pedal 2; first sensors 3 designed to detect the travel C and speed of actuation v of the brake pedal 2; an electronic control unit 4, connected to the first sensors 3; an electromechanical actuator 5 connected to the electronic control unit 4, and constituted by an electric motor 6 and by a piston 7, which is connected to the electric motor 6 for example by a connection element of the wormscrew type (not illustrated); a brake disk 8, connected to the electromechanical actuator 5 and fixed with respect to a wheel of a vehicle (in a way known and not illustrated); and second sensors 9, which are designed to detect information regarding the braking action exerted by the electromechanical actuator 5 on the brake disk 8 and are feedback-connected to the electronic control unit 4.

In use, the first sensors 3 send data regarding the travel C and speed of actuation v of the brake pedal 2 to the electronic control unit 4, which, as a function of said data, generates a control signal (in voltage V or current I) for the electromechanical actuator 5 (in particular, for the electric motor 6). As a function of said control signal, the electric motor 6 generates a torque that is converted into a linear movement of the piston 7 by the connection element of the wormscrew type. Consequently, the piston 7 presses on the brake disk 8 (via pads of abrasive material, not illustrated) so as to brake rotation thereof. The second sensors 9 detect the value of the pressure P exerted by the piston 7 on the brake disk 8 and the position x of the piston 7 with respect to the brake disk 8, and send said feedback data to the electronic control unit 4. The electronic control unit 4 thus implements a closed-loop control (for example, a PID control) of the braking action.

According to one aspect of the present disclosure, the second sensors 9 comprise a pressure sensor according to any one of the embodiments described in what follows, in particular of an integrated type, which are obtained in MEMS technology and are designed to measure the pressure P exerted by the piston 7 on the brake disk 8. In a way not illustrated, the pressure sensor 15 is housed in a casing of the electromechanical actuator 5 and is configured in such a way as to be sensitive to the pressure P exerted by the piston 7.

Figure 2:
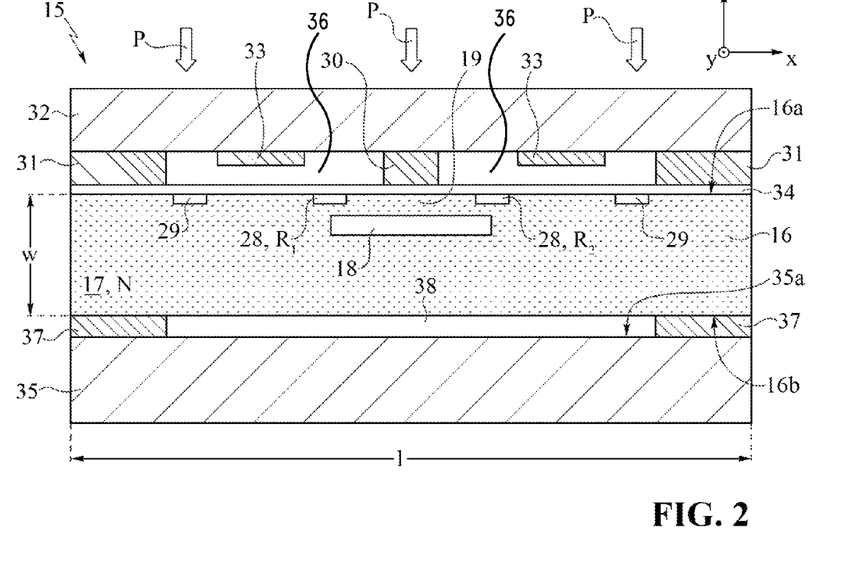
FIG. 2 is a cross-sectional view (not in scale) of a pressure sensor obtained according to one embodiment of the present disclosure.

In detail, as represented in FIG. 2 in a reference system of orthogonal axes X, Y, Z, the pressure sensor 15 comprises a monolithic body 16 of semiconductor material, preferably silicon, in particular monocrystalline silicon, for example of an N type with orientation (100) of the crystallographic plane. The monolithic body 16 has a quadrangular cross-section, for example square of side 1 (measured along the axis X or Y) comprised, for example, between 1 mm and 20 mm, preferably between 10 mm and 15 mm, delimited at the top by a first surface 16a and at the bottom by a second surface 16b, which is opposite and parallel to the first surface 16a. The monolithic body 16 has a thickness, measured along Z between the first and second surfaces 16a, 16b, equal to w and substantially uniform, for example comprised between 50 and 900 µm, preferably comprised between 500 and 900 µm, in particular equal to 720 µm.

The monolithic body 16 comprises a bulk region 17 and a first cavity 18, buried in the monolithic body 16. The first cavity 18 has a cross-section that is, for example, square with side comprised between 300 and 400 µm and a thickness (measured along the axis Z) comprised between 2 and 6 µm, for example 4 µm. The first cavity 18 is separated from the first surface 16a by a thin portion of the monolithic body 16, which forms a membrane 19, which has a thickness comprised, for example, between 1 and 60 µm, preferably between 4 and 10 µm. The bulk region 17 is thus the portion of the monolithic body 16 that surrounds the membrane 19 and the first cavity 18.

The membrane 19 is flexible and is able to undergo deflection in the presence of external loads. In particular, as described in detail hereinafter, the membrane 19 undergoes deformation as a function of a force or pressure P acting on the monolithic body 16. According to one embodiment, the thickness of the membrane 19 is smaller than the thickness of the first cavity 18 in order to prevent shear stresses in the points of constraint of the membrane 19, which might cause failure of the membrane itself.

The first cavity 18 may be obtained with the manufacturing process described in the U.S. Pat. No. 8,173,513, which is incorporated by reference herein in its entirety.

Present at least partially within the membrane 19 are first piezoresistive sensing elements 28 (in particular, four in number, set at the vertices of an ideal cross centered at the center of the membrane 19), constituted by regions with a doping, for example, of a P type. The first piezoresistive sensing elements 28 may be obtained via diffusion of dopant atoms through an appropriate diffusion mask, and have, for example, an approximately rectangular cross-section. In addition, the first piezoresistive sensing elements 28 may be connected together so as to form a Wheatstone-bridge circuit.

Alternatively, the first piezoresistive sensing elements 28 may form part of a ring oscillator circuit.

In a surface portion of the bulk region 17, in a position separate and distinct from the membrane 19, second piezoresistive sensing elements 29 are present (in particular, four in number, set at the vertices of a further ideal cross centered at the center of the membrane 19), which are also, for instance, formed by regions having, for example, a doping of a P type obtained by diffusion. The second piezoresistive sensing elements 29 are separated from the membrane 19 (and thus from the first piezoresistive sensing elements 28) by a distance (measured along the axis X) equal to or greater than, for example, 10 μm, preferably 50 μm, so as not to be affected significantly by the stresses on the membrane 19 (and on the first piezoresistive sensing elements 28) when the force P acts. In particular, the second piezoresistive sensing elements 29 are integrated in a solid and compact portion of the bulk region 17, having a thickness substantially equal to the distance w.

According to one embodiment, an interface layer 34 coats the first surface 16*a* of the monolithic body 16. The interface layer 34 may be a mono-layer or a multi-layer comprising an elastic material, such as for example polyamide, or else may be a mono-layer or a multi-layer of dielectric material, for example silicon oxide, or alternatively a multi-layer comprising a silicon-oxide layer on which a polyamide layer extends. The interface layer 34 may comprise one or more metallization levels (not illustrated), interconnected by connection vias.

A first substrate 32, for example of semiconductor material, such as silicon, extends over the interface layer 34, coupled to the interface layer 34 by anchorage elements 31 that extend between the interface layer 34 and the first substrate 32, in peripheral regions of the interface layer 34 and of the underlying monolithic body 16. Considered herein as peripheral regions are those regions of the monolithic body 16 that extend (when considered in the planes XY, XZ and YZ) outside the second sensing elements 29. In particular, the anchorage elements 31 extend along the entire perimeter of the interface layer 34 and of the monolithic body 16, outside the second piezoresistive sensing elements 29. The anchorage elements 31 laterally surround and define a cavity 36 that extends between the first substrate 32 and the interface layer 34.

The anchorage elements 31 are made, for example, of dielectric material, such as silicon oxide or silicon nitride, and are obtained with deposition and etching steps, in themselves known.

A first focusing region 30, which is also for example of dielectric material, such as silicon oxide or silicon nitride, extends between, and in direct contact with, the interface layer 34 and the first substrate 32. In particular, the first focusing region 30 extends over the membrane 19, i.e., at least partially aligned to the membrane 19 along the axis Z. In this way, in use, the first focusing region 30 focuses the pressure P on the membrane 19 itself, forcing it to undergo deformation. The first focusing region 30 is obtained during the same steps of production of the anchorage elements 31.

The pressure sensor 15 further comprises a second substrate 35, made, for example, of semiconductor material, such as silicon (having a thickness comprised, for instance, between 50 and 900 μm, preferably between 500 and 900 μm, in particular 720 μm), or ceramic material, or glass, or some other material still, having a similar coefficient of elasticity, which extends facing the second surface 16*b* of the monolithic body 16, mechanically coupled to the second surface 16*b* by anchorage elements 37 that extend between the second surface 16*b* of the monolithic body 16 and a respective surface 35*a* of the second substrate 35, at least in part in peripheral regions of the second surface 16*b* of the monolithic body 16. As defined previously, considered as peripheral regions are those regions of the monolithic body that extend, as viewed in the planes XY, XZ, and YZ, outside the second piezoresistive sensing elements 29. However, in this case, as is on the other hand illustrated in FIG. 2, the anchorage elements 37 extend in part, once again as viewed in the plane XY, on top of the second piezoresistive sensing elements 29.

In particular, the anchorage elements 37 extend along the entire perimeter of the second surface 16*b* of the monolithic body 16 and of the surface 35*a* of the second substrate 35 so as to define a second cavity 38 between the second surface 16*b* and the surface 35*a*.

The anchorage elements 37 are of dielectric material, for example silicon oxide or silicon nitride, and have a thickness, along Z, comprised for example between 0.1 μm and 20 μm, for example 1 μm. The distance (along Z) between the second surface 16*b* and the surface 35*a* defines the height of the second cavity 38, substantially equal to the thickness of the anchorage elements 37.

Extending further between the interface layer 34 and the first substrate 32 and in the cavity 36 are one or more second focusing regions 33, which are coupled to the first substrate 32 (but not to the interface layer 34) and have a thickness, along Z, smaller than the thickness, once again along Z, of the first focusing region 30. In particular, the second focusing regions 33 have a thickness such that, when the membrane 19 comes into contact with the bottom of the first cavity 18, or saturates (i.e., it is completely deflected, thus closing the first cavity 18), or reaches the desired full-scale value, the second focusing regions 33 are in direct contact with the interface layer 34. In other words, the distance (along Z) between the second focusing regions 33 and the interface layer 34 is equal to or smaller than the thickness (along Z) of the first cavity 18.

As an alternative to what has been described, the second focusing regions 33 may be coupled to the interface layer 34 but not to the first substrate 32, with which they come into direct contact when the membrane 19 reaches the bottom of the cavity 18, or saturates, or reaches the desired full-scale value.

According to a further embodiment, the second focusing regions 33 may be provided coupled in part to the interface layer 34 and in part to the first substrate 32.

Thus, when a pressure P is applied in use on the pressure sensor, the membrane 19 undergoes deflection until it comes into contact with the bottom of the cavity 18. A minimum pressure value $P_{MAX1}$ for bringing the membrane 19 into contact with the bottom of the cavity 18 depends upon the thickness of the membrane 19 and upon the material of which it is made. For instance, the membrane 19 is produced in such a way as to come into contact with the bottom of the cavity 18 when it is subjected at least to a pressure $P_{MAX1}$ comprised between 8 and 50 N. In particular, with a membrane 19 of monocrystalline silicon having a thickness, along Z, equal to 8 μm, the pressure value $P_{MAX1}$ is 10 N.

Intermediate pressure values $P_{INT1} < P_{MAX1}$ are such as to cause progressive deflection of the membrane 19 (the higher the current value of $P_{INT1}$, the greater the deflection of the membrane), but not such as to bring it into contact with the bottom of the cavity 18.

As the pressure P increases, the second focusing regions 33, together with the first focusing region 30, co-operate to bring about deflection of the monolithic body 16, which thus behaves, as a whole, as a second membrane suspended over the second cavity 38. A minimum pressure value $P_{MAX2}$ such as to bring the monolithic body 16 into contact with the bottom 35*a* of the cavity 38 depends upon the thickness of the monolithic body 16 and upon the material of which it is made. For instance, the monolithic body 16 is produced in such a way as to come into contact with the bottom 35*a* of the cavity 38 when it undergoes a pressure at least equal to $P_{MAX2}$ higher than $P_{MAX1}$ (and having a maximum value such as not to damage the pressure sensor, for example a full-scale value comprised between 10 and 20 kN). In a particular example, with a monolithic body 16 of monocrystalline silicon having a thickness w of 720 μm, the pressure value $P_{MAX2}$ is 10 kN.

Intermediate pressure values $P_{INT2}$ such that $P_{MAX1} < P_{INT2} < P_{MAX2}$ are such as to cause progressive deflection of the monolithic body 16 (the higher the current value of $P_{INT2}$, the greater the deflection of the monolithic body 16), but not to bring the monolithic body 16 into contact with the bottom 35a of the cavity 38.

The second piezoresistive sensing elements 29 have the function, in use, of detecting the degree of deflection of the second membrane, i.e., of the monolithic body 16, when the deflection of the first membrane 19 is maximum (saturation condition). For this reason, it is preferable to form the second piezoresistive sensing elements 29 sufficiently far from the first membrane 19 so that they will not be affected by its deflection, but in any case in a region of the monolithic body 16 that undergoes deflection when the first membrane 19 is saturated. For instance, they may be set substantially aligned, along Z, with respective peripheral regions of the second cavity 38, i.e., regions of the second cavity 38 close to or bordering on the anchorage elements 37.

As has been anticipated, the general operation of the pressure sensor 15 is based upon the so-called piezoresistive effect, whereby a stress applied on a piezoresistive element causes a variation of resistance thereof. In the case of semiconductor materials, such as silicon, the stress applied, in addition to determining a variation of the dimensions of the piezoresistive element, brings about a deformation of the crystalline lattice and thus an alteration of the mobility of the majority charge carriers and a variation of resistivity. For instance, in silicon, to a deformation of 1% of the crystalline lattice, there corresponds a variation of approximately 30% of the mobility of the majority charge carriers. In particular, the variation of resistance is caused by stresses acting both in a parallel direction (so-called longitudinal stresses) and in a direction normal to the plane in which the piezoresistive elements lie (so-called transverse stresses). The variation of resistance of a piezoresistive element may in general be expressed by the following relation:

$$\frac{\Delta R}{R} = \frac{\pi_{44}}{2}(\sigma_l - \sigma_t)$$

where R is the resistance of the piezoresistive element, $\Delta R$ is the variation of said resistance, $\Pi_{44}$ is one of the piezoresistive coefficients of the semiconductor material, for example equal to $138.1 \cdot 10^{-11}$ $Pa^{-1}$ for monocrystalline silicon of a P type, and $\sigma_1$, $\sigma_2$ are, respectively, the longitudinal stress and the transverse stress to which the piezoresistive element is subjected.

With reference to the pressure sensor 15 of FIG. 2, the monolithic body 16 is arranged in such a way that the pressure P to be measured causes a stress in a direction normal to the first main outer surface 16a (i.e., in this embodiment, along Z).

In particular, in a first operating condition, the pressure P brings about a deformation of the membrane 19, which is forced to undergo deformation. This deformation induces longitudinal and transverse mechanical stresses in the first piezoresistive sensing elements 28, which consequently modify the value of resistance. Considering, for example, a Wheatstone-bridge configuration of the first piezoresistive sensing elements 28, generally they are set in such a way that part of them (e.g., two of them) undergo a compressive stress, and the remaining ones (the other two, in the case provided by way of example of four piezoresistors) undergo tensile stress so as to increase the sensitivity of the corresponding Wheatstone-bridge circuit. The variation of resistance of the first piezoresistive sensing elements 28 thus causes an unbalancing of the Wheatstone-bridge circuit, which generates a voltage signal at output from the Wheatstone-bridge circuit, which may be detected by an appropriate read circuit.

In addition, in a second operating condition in which the pressure P assumes a value higher than the one required for bringing the second focusing regions 33 into contact with the interface layer 34, a deformation of the monolithic body 16 is induced that brings about a longitudinal and transverse mechanical stress in the second piezoresistive sensing elements 29, which consequently modify the value of resistance, as described with reference to the first piezoresistive sensing elements 28.

In detail, one aspect of the present disclosure is based upon the realization that for low values of the pressure P, the deformation of the second piezoresistive sensing elements 29 is practically negligible. Instead, the membrane 19 is induced to undergo deformation, causing a corresponding deformation of the first piezoresistive sensing elements 28, which is detected by the read circuit in order to supply a measurement of the pressure P applied. As the pressure P increases, the deformation of the membrane 19 increases until the membrane 19 itself comes into contact with the bottom of the underlying first cavity 18, thus saturating the pressure value supplied at output (in so far as any further deformation is not possible). In particular, this saturation may occur for values of the pressure P for example around 10 N.

At this point, a further increase in the pressure P begins to affect the entire first main outer surface 16a and to cause a deflection of the monolithic body 16, causing a consequent non-negligible variation of the resistance of the second piezoresistive sensing elements 29, from which the value of the pressure P is derived. Saturation of the second membrane obtained by the monolithic body 16 occurs for values of the pressure P around 10 kN.

Consequently, the measurements of pressure supplied by the first and second piezoresistive sensing elements 28, 29 are independent and complementary, given that said elements intervene for different values of the pressure P. The pressure sensor 15 thus has a first measuring scale, valid for low values of the pressure P and a full-scale value around 10 N (determined by the action of the membrane 19 and of the first piezoresistive sensing elements 28, which thus form together an element sensitive to low pressures), and a second measuring scale, valid for high values of the pressure P and having a full-scale value around 10 kN (determined by the action of the monolithic body 16 and of the second piezoresistive sensing elements 29, which thus form together an element sensitive to high pressures). The first measuring scale is more precise than the second, given that the membrane 19 is sensitive to even minimal variations of the pressure P.

The pressure sensor 15 presents a considerable strength in regard to high pressures. As is known, in fact, monocrystalline silicon has a high ultimate strength in regard to compressive stresses, in particular up to 2 GPa, according to the crystallographic orientation, so that it is able to withstand, with ample margin, the maximum pressure values that arise within a braking system. Furthermore, the deflections of the membrane 19 in a vertical direction are limited by the relatively small thickness of the first cavity 18, thus preventing failure of the membrane 19 for high pressure values.

The first piezoresistive sensing elements 28 may, for example, be connected together to form a Wheatstone-bridge circuit (FIG. 3), with resistors that vary in the same direction set on opposite sides of the bridge so as to increase the sensitivity of the circuit. The Wheatstone-bridge circuit is supplied with a supply voltage $V_{in1}$ and supplies an output voltage $V_{out1}$.

Figure 3:
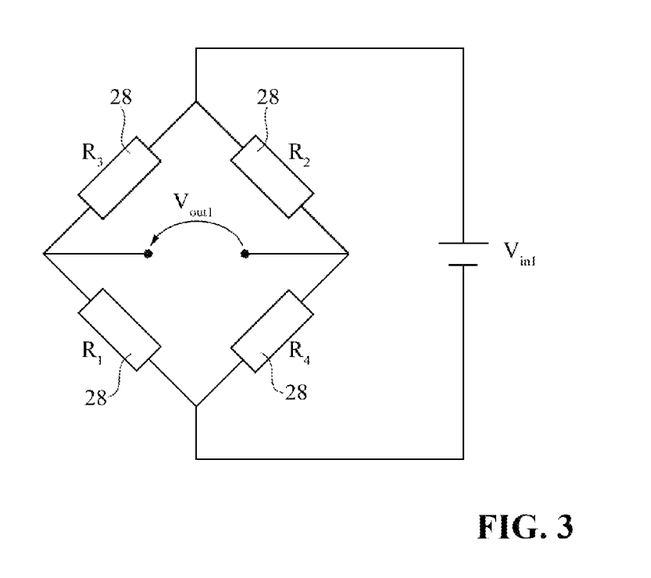
FIG. 3 shows a Wheatstone-bridge circuit formed by piezoresistive elements, integrated in the pressure sensor of FIG. 2.

The second piezoresistive sensing elements 29 may in turn be connected so as to form, for example, an own Wheatstone-bridge circuit, similar to the one illustrated in FIG. 3. Advantageously, the particular arrangement of the piezoresistors in the Wheatstone-bridge circuit enables a differential measurement to be made, where the variations of resistance due to the environmental parameters (for example, temperature) cancel out, thus rendering the second output voltage $V_{out1}$, and thus the value of the pressure P measured, insensitive to said parameters.

Note, in particular, that the first and second piezoresistive sensing elements 28, 29 are not electrically connected together and form part of two distinct and independent electronic read circuits (so as to provide, as highlighted previously, the two measuring scales of the pressure sensor 15). In particular, for low values of the pressure P, the voltage at output from the circuit formed by the second piezoresistive elements 29 is substantially zero, whereas the voltage $V_{out1}$ at output from the circuit formed by the first piezoresistive elements 28 is used by an appropriate electronic measuring circuit (of a per se known type and comprising, for example, at least one instrumentation amplifier) for measuring the pressure P. Instead, for high values of the pressure P, the output voltage $V_{out1}$ of the circuit formed by the first piezoresistive elements 28 saturates, and the electronic measuring circuit obtains the measurement of the pressure P from the output voltage $V_{out2}$ of the circuit formed by the second piezoresistive elements 29.

Figure 4:
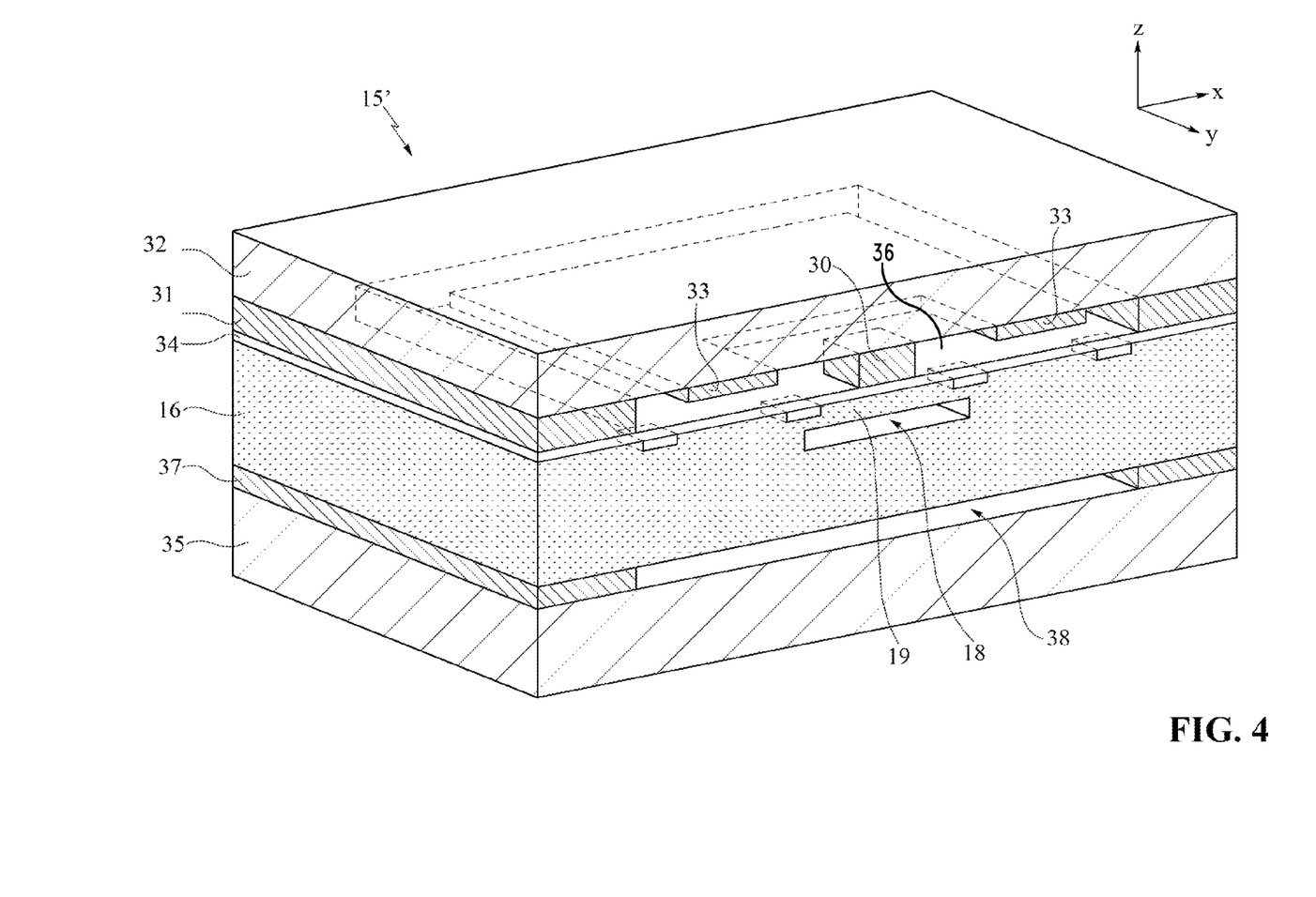
FIG. 4 is a perspective view of the pressure sensor of FIG. 2.

FIG. 4 shows a perspective view of a portion 15' of the pressure sensor 15 of FIG. 2. In particular, the portion 15' represented in FIG. 4 is a portion of pressure sensor 15 cut along the plane of section of FIG. 2. Joining of two specular portions 15' forms the pressure sensor 15.

As may be seen from FIG. 4, the anchorage elements 31 extend along the entire perimeter of the monolithic body 16, forming a frame on which the first substrate 32 rests. Likewise, the second focusing regions 33 extend within the region defined by the anchorage elements 31, mechanically isolated from the latter region so as to be able to undergo deflection together with the first substrate 32.

In addition, the second focusing regions 33 have a recess within which the first focusing region 30 is housed. The second focusing regions 33 are thus also separate from the first focusing region 30 so as not to have constraints in order to undergo deflection together with the first substrate 32. In the embodiment of FIG. 4, the second focusing regions 33 extend joined to one another to form a single region. However, according to different embodiments, they may be mechanically separate/isolated from one another, for example isolated from one another at the recess that houses the first focusing region 30.

The anchorage elements 37 have a shape and extension similar to that of the anchorage elements 31, and define the second cavity 38, inside the frame formed by the anchorage elements 37.

According to a further embodiment (not illustrated in the figure), the anchorage elements 31 and the second focusing regions 33 are joined together, but with a respective thickness (along Z) that varies along the axis X so that the anchorage elements 31 and the second focusing regions 33 have a different thickness, as already described.

Figure 5:
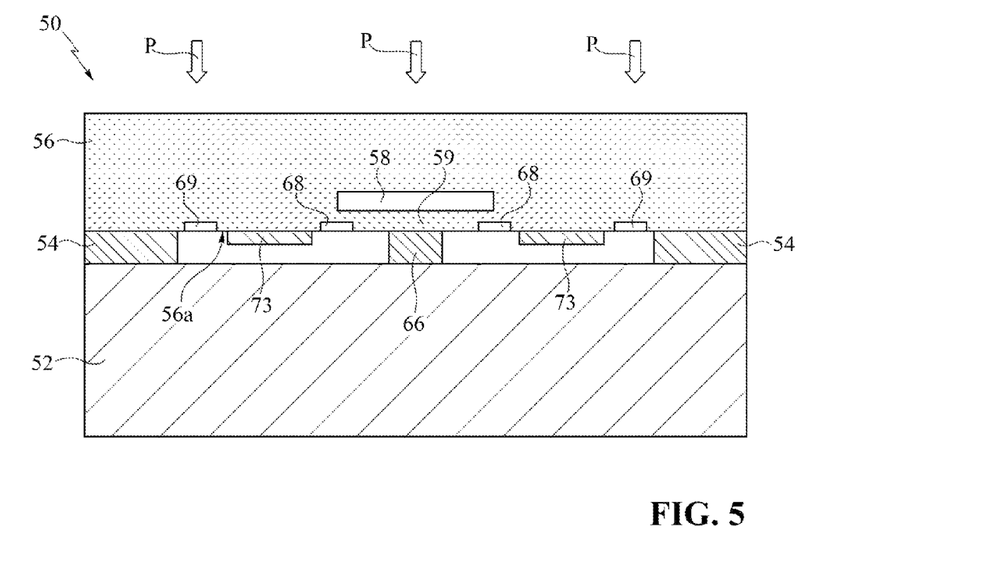
FIG. 5 is a cross-sectional view (not in scale) of a pressure sensor obtained according to a further embodiment of the present disclosure.

FIG. 5 is a lateral sectional view of a further embodiment of a pressure sensor 50, according to a further aspect of the present disclosure.

The pressure sensor 50 comprises a base substrate 52, for example of semiconductor material such as silicon, or ceramic material, or glass, or some other material still, having a similar coefficient of elasticity, mechanically coupled to a monolithic body 56 of semiconductor material, such as silicon, by one or more anchorage elements 54. The anchorage elements 54 are similar to the anchorage elements 31 of FIGS. 2 and 4, and are not described any further herein.

The monolithic body 56 is similar to the monolithic body 16 described previously, and houses a buried cavity 58. The buried cavity 58 corresponds to the first cavity 18 of FIG. 2 and is obtained with the same manufacturing method. Extending between the buried cavity 58 and a surface 56a of the monolithic body 56 is a flexible membrane 59 that is able to undergo deflection in the presence of external loads. In particular, as already described in detail with reference to the membrane 19 of FIG. 2, the membrane 59 undergoes deformation as a function of the pressure P acting on the monolithic body 56.

Present at least partially within the membrane 59 are first piezoresistive sensing elements 68, which are similar to the piezoresistive elements 28 of FIG. 2 and have the same purpose. In particular, the first piezoresistive sensing elements 68 are four in number, are constituted by regions with a doping of a P type, and are connected together so as to form a Wheatstone-bridge circuit. In a per se known manner, the resistance of the first piezoresistive sensing elements 68 is variable as a function of the deformation of the membrane 59.

In a position separated and distinct from the membrane 59, second piezoresistive sensing elements 69 are present, which are similar to the piezoresistive elements 29 of FIG. 2 and have the same purpose. These are also constituted by regions with a doping of a P type and are separated from the membrane 59 by a distance such as not to be affected significantly by the stresses acting on the membrane 59 during a first operating condition of action of the force P (e.g., up to 10 N). Hereinafter, the force P will refer indifferently to a force or a pressure that the same force exerts on a surface.

A first focusing region 66, similar to the first focusing region 30 of FIGS. 2 and 4, extends between the substrate 52 and the monolithic body 56, in an area corresponding to the membrane 59.

Second focusing regions 73, similar to the second focusing regions 33 of FIG. 2, extend between the first focusing region 66 and the anchorage elements 54. The second focusing regions 73 have a thickness, along Z, smaller than the thickness, along Z, of the anchorage elements 54 and of the first focusing region 66. Advantageously, the second focusing regions 73 are already aligned to the first and second piezoresistive sensing elements 68, 69. Note that here, as likewise in the ensuing figures, for simplicity of representation the interface layer 34 has been omitted.

In use, when the pressure P is applied, the presence of the first focusing region 66 causes a deflection of the membrane 59, which undergoes deflection in proportion to the pressure applied, until it comes into contact with the internal wall of the cavity 58 (first operating condition); as the pressure P increases, the monolithic body 56 undergoes deflection in the area corresponding to the portions thereof that house the second focusing regions 73 (i.e., in the area corresponding to the portions of the monolithic body 56 that extend between the anchorage elements 54 and the first focusing region 66), until the second focusing regions 73 come into contact with the substrate 52, thus determining a full-scale value for the measurement of the deflection, and preventing undesirable failure of or damage to the monolithic body 56 (second operating condition). The monolithic body 56 thus behaves as a second membrane suspended on the cavity present between the monolithic body 56 itself and the substrate 52.

Figure 6:
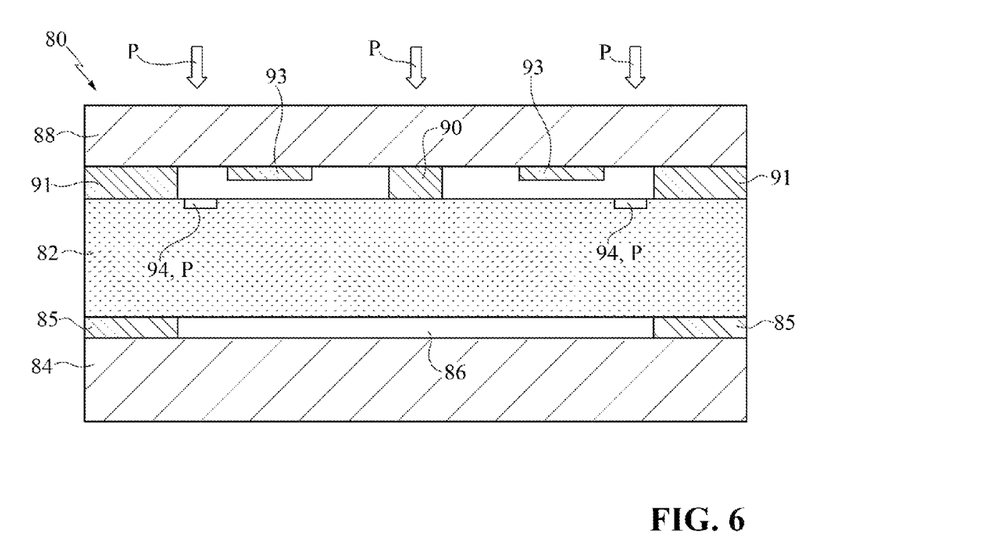
FIG. 6 is a cross-sectional view (not in scale) of a pressure sensor obtained according to a further embodiment of the present disclosure.

FIG. 6 shows a further embodiment of a pressure sensor 80 according to the present disclosure.

The pressure sensor 80 comprises a monolithic body 82, for example of semiconductor material (e.g., silicon). The monolithic body 82 extends between a first substrate 88 and a second substrate 84. In greater detail, the monolithic body 82 is mechanically coupled to the second substrate 84 by anchorage elements 85 similar to the anchorage elements 37 described with reference to FIG. 1. Thus, the anchorage elements 85 extend along a peripheral, or perimetral, region of the monolithic body 82 and define a cavity 86. According to one embodiment, the anchorage elements 85 surround the cavity 86 completely so that said cavity 86 is completely isolated from outside. According to a different embodiment, the cavity 86 is only partially surrounded by the anchorage elements 85. Set on the side of the monolithic body 82 opposite to the side on which the anchorage elements 85 extend is the first substrate 88, for example of semiconductor material, similar to the first substrate 32 described with reference to FIG. 2, or ceramic material, or glass, or some other material still, having a similar coefficient of elasticity. In particular, the first substrate 88 is mechanically coupled to the monolithic body 82 by anchorage elements 91 similar to the anchorage elements 31 of FIG. 2. Furthermore, extending between the first substrate 88 and the monolithic body 82 are first and second focusing regions 90, 93 similar to the respective first and second focusing regions 30, 31 of FIG. 2, and thus not described any further. In a variant (not illustrated), the second focusing regions 93 may be arranged on the monolithic body 82, like the second focusing regions 73 of FIG. 5.

Piezoresistive sensing elements 94 (in particular four in number, electrically connected together to form a Wheatstone-bridge circuit), constituted by regions with a doping of a P type, extend in the monolithic body 82 in the proximity of the surface thereof facing the first substrate 88. More in particular, the piezoresistive elements extend in a portion of the monolithic body 82 between the anchorage elements 91 and the second focusing regions 93, specularly with respect to the first focusing region 90.

Figure 7:
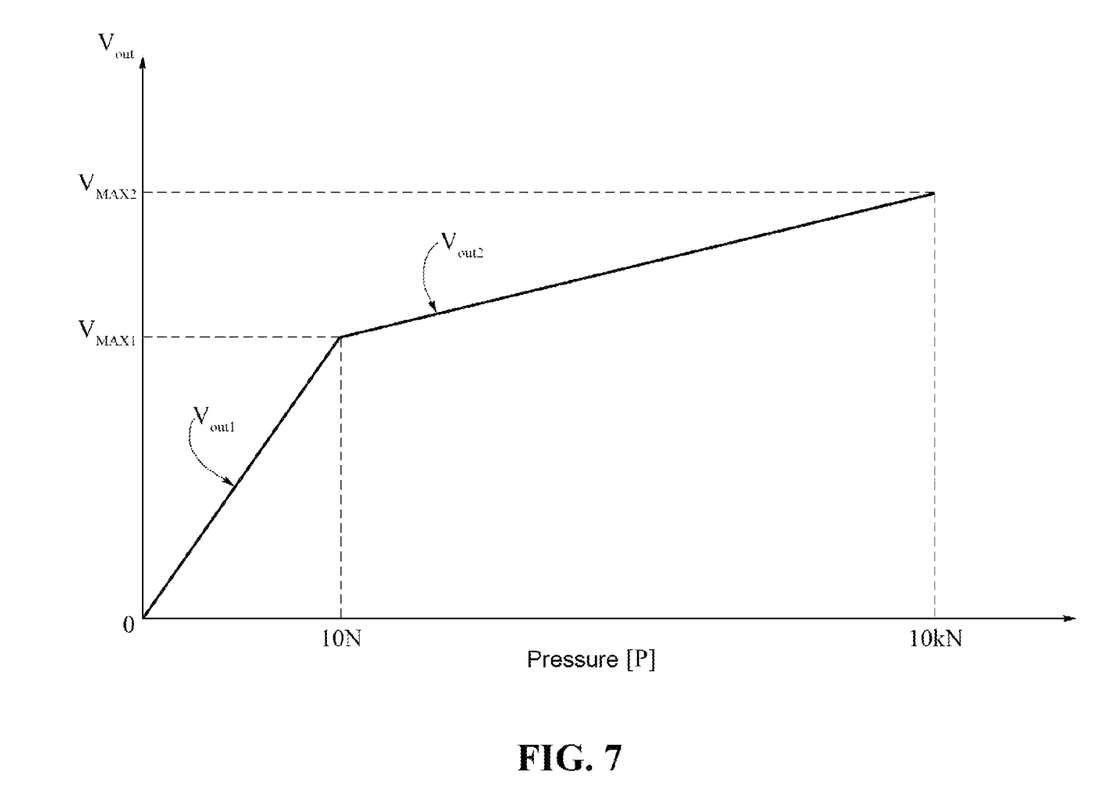
FIG. 7 shows an electrical signal generated at output from the pressure sensor of FIG. 6 as a function of a pressure to which the sensor itself is subjected in use.

In use, during a first operating condition, a pressure, or force, P is applied to the first substrate 88 and is transferred, by the anchorage elements 91 and of the first focusing region 90, to the monolithic body 82. The monolithic body 82 consequently undergoes deflection, generating a longitudinal and transverse stress in the area corresponding to the piezoresistive sensing elements 94. FIG. 7 shows, qualitatively, the plot of the output voltage signal generated by the Wheatstone-bridge circuit during the first operating condition ($V_{out1}$) and during the second operating condition ($V_{out2}$).

If the force P applied is such as to bring the second focusing regions 93 to come into contact with the monolithic body 82 (in the example of FIG. 7, this event there corresponds to a pressure of 10 N and generates at output from the bridge circuit a voltage $V_{MAX1}$), the pressure sensor 80 enters a second operating condition, where the monolithic body 82 continues to undergo significant deflection in the area corresponding to the regions comprised between the anchorage elements 91 and the second focusing regions 93, i.e., in the portion thereof that houses the piezoresistors 94. In the example of FIG. 7, at the pressure of 10 kN the second focusing regions 93 come into contact with the monolithic body 82, and an output voltage $V_{out2}$ is generated by the bridge circuit equal to $V_{MAX2} > V_{MAX1}$.

As may be noted from FIG. 7, in the second operating condition, the voltage $V_{out2}$ at output from the Wheatstone-bridge circuit changes slope with respect to the voltage $V_{out1}$. Knowing the plot of the signal $V_{out}$ at output from the bridge circuit (which may be obtained experimentally in a per se known manner by applying an increasing force P and measuring the output $V_{out}$) it is thus possible to identify, at each instant of operation of the pressure sensor 80, in which operating condition it is by correlating the output voltage value $V_{out}$ with the effective pressure value P to which the pressure sensor is subjected.

Figure 8:
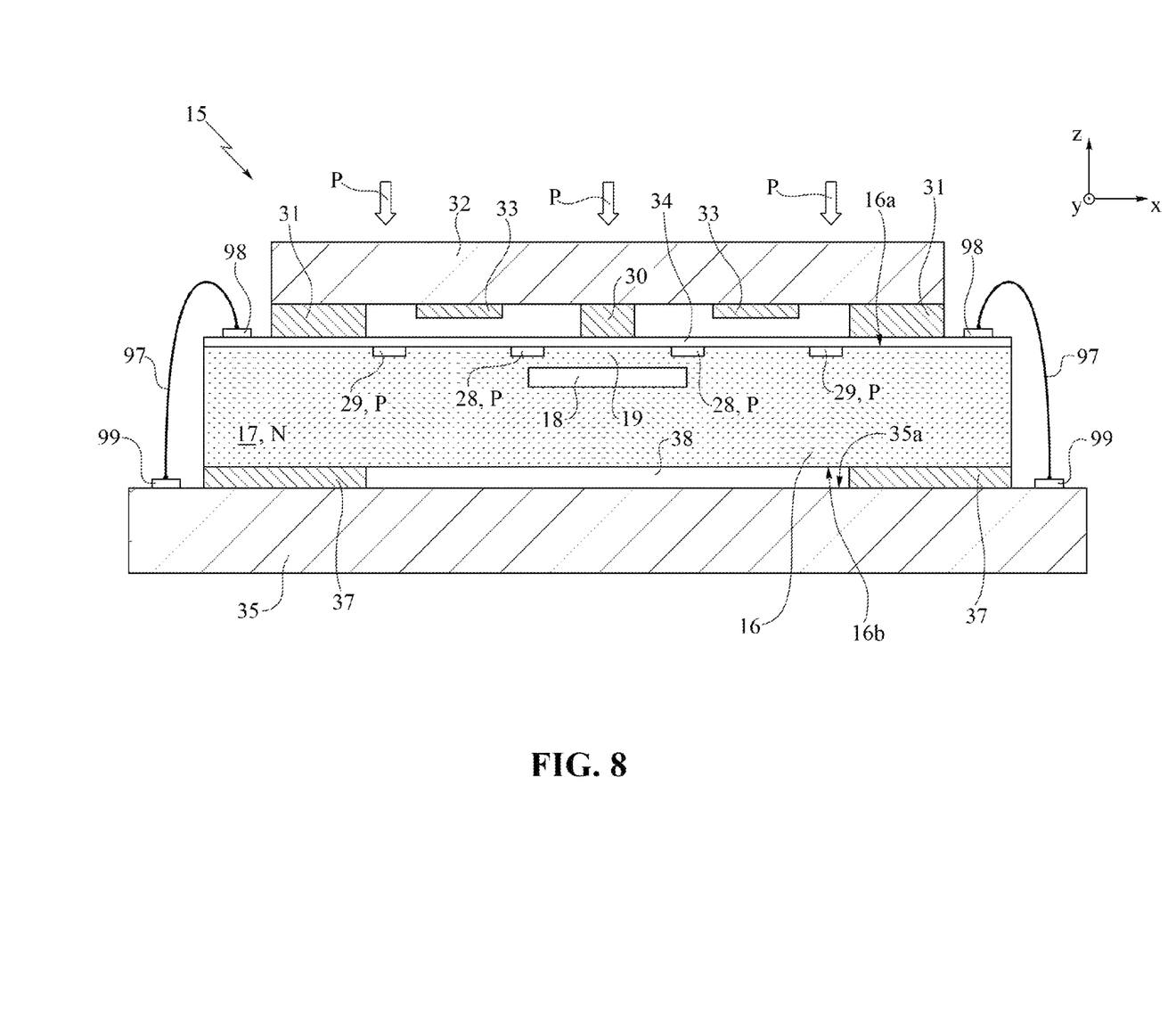
FIGS. 8-12 show respective embodiments of pressure sensors designed to transfer electrical signals, generated as a function of a pressure to which the sensor is subject in use, at output from the pressure sensor.

FIG. 8 is a cross-sectional view of the pressure sensor 15 of FIG. 2 in which the second substrate 35 has an extension, in the plane XY, greater than the respective extension of the monolithic body 16. In turn, the monolithic body 16 has an extension, in the plane XY, greater than the respective extension of the first substrate 32. In this way, it is possible to provide electrical-contact pads 98 suitably connected (in a way known and not illustrated herein), for example to the first and second piezoresistive sensing elements 28, 29 on the top surface 16*a* of the monolithic body 16 alongside the first substrate 32. By way of example, only two pads 98 are visible in FIG. 8, but they may be any in number, as required. Between the pads 98 and the first and second piezoresistive sensing elements 28, 29 a further circuit may be present, for example an interface circuit, or an acquisition circuit, or a conversion circuit so as to encode appropriately the value of the physical quantity measured by the pressure sensor 15. It is likewise possible to provide respective electrical-contact pads 99 (electrically coupled to conductive paths, not illustrated) on the top surface 35*a* of the second substrate 35. By way of example, only two pads 99 are visible in FIG. 8, but they may be any in number, as desired.

The pads 98 are electrically connected to respective electrical output terminals of the Wheatstone-bridge circuits formed, respectively, by the first piezoresistive sensing elements 28 and by the second piezoresistive sensing elements 29. The electrical connection between the pads 98 and the pads 99 is obtained by wire bonding 97. With the use of appropriate conductive paths coupled to the pads 99 it is thus possible to transfer the electrical signal supplied by the Wheatstone-bridge circuits outside the pressure device 15, for example to the control unit 4 of FIG. 1. Further electrical contact pads (not illustrated) may be provided for sending the power supply to the pressure sensor.

Figure 9:
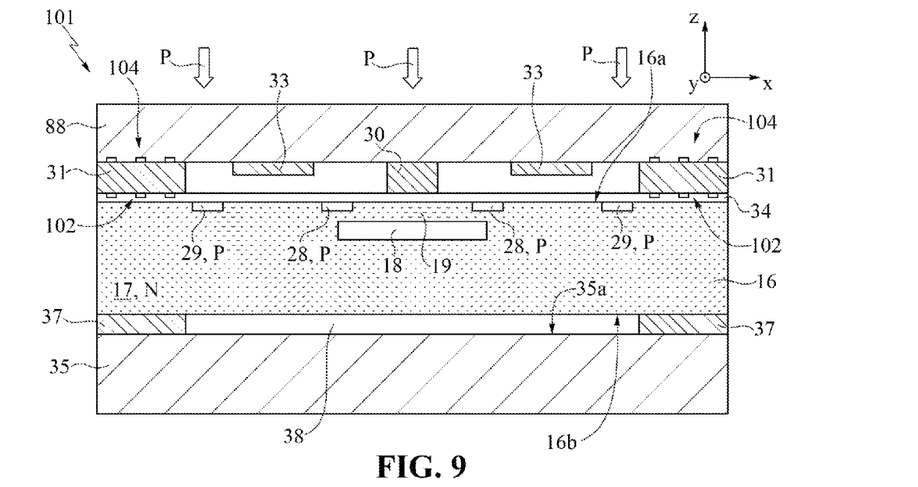

FIG. 9 shows a further embodiment of a pressure sensor 101, where the electrical signal generated by the first and second piezoresistive sensing elements 28, 29 is transferred outside the pressure sensor 101 by inductive coupling.

In this embodiment, one or more inductors 102 are integrated in the interface layer 34 (or, alternatively, in the monolithic body 16 on the surface 16*a*), and respective one or more inductors 104 are integrated in the first substrate 88 in such a way that each inductor 102 is inductively coupled to a respective inductor 104. In the case where first substrate 88 is made of semiconductor material, it will be necessary for the respective one or more inductors 104 to be integrated in the interface layer (here not shown and similar to the layer 34). The inductors 102 are operatively coupled to respective output terminals of circuits (for example, they may comprise a transceiver/transponder, an AC-DC converter, a finite-state digital circuit, a microcontroller), here not illustrated, which comprise or are coupled to the first and second piezoresistive sensing elements 28, 29, for example connected via a Wheatstone bridge or forming part of a ring oscillator circuit so as to receive the voltage signals generated as a result of the deformation of the membrane 19 and of the monolithic body 16, during use of the pressure sensor, and transfer said signals to the respective inductors 104. The inductors 104 are coupled to conductive paths (not illustrated) to transfer the signal of detection of the pressure P outside the pressure sensor, for example to the control unit 4 of FIG. 1. The pressure sensor may be supplied via further electrical contact pads (not illustrated) or via the inductors 102, 104 in a known way.

According to a further embodiment of a pressure sensor 105 (illustrated in FIG. 10), one or more inductors 106 are integrated in the interface layer 34. However, the first substrate 88 does not integrate respective inductors. Inductors 109 are instead provided in an external board, for example a PCB (printed-circuit board) 110. During mechanical coupling of the pressure sensor 105 of FIG. 10 to the PCB 110, the pressure sensor 105 is set on the PCB 110 in such a way that the inductors 106 are inductively coupled, in use, to the inductors 109. The inductors 106 and 109 are appropriately sized in order to guarantee inductive coupling, and the substrate 88 extending between them should preferably have a high resistivity (for example, it may be intrinsic silicon or a dielectric material such as a ceramic or glass) so as to prevent onset of eddy currents. For instance, the inductors 109 are larger in size than the inductors 106.

Figure 10:
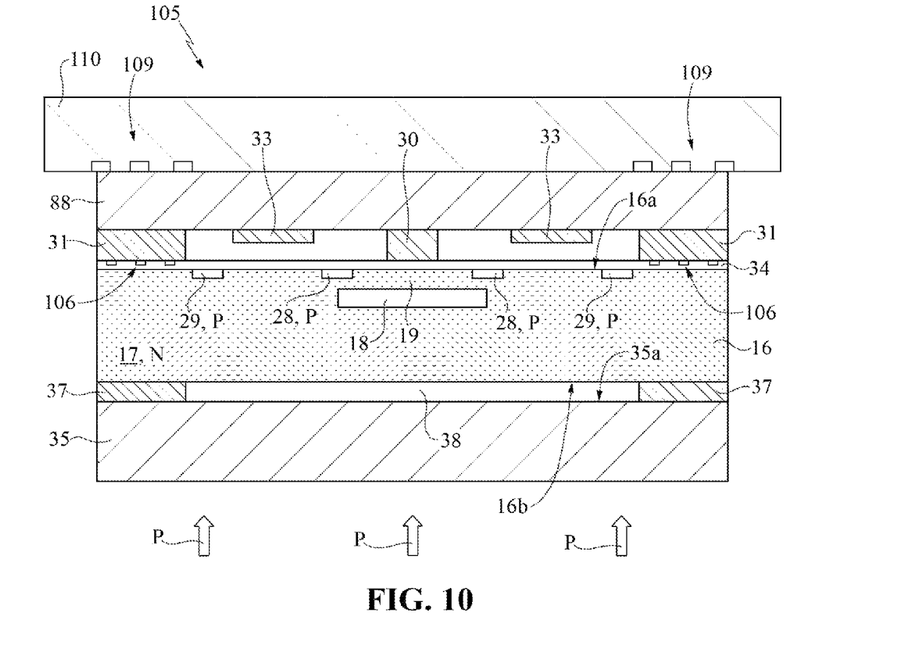

Owing to the presence of the PCB 110, the pressure P is applied, in this example, on the second substrate 35.

Appropriate electrical connections are provided, in a per se known manner, on the PCB 110, for acquiring an electrical signal from the inductors 109 and sending it, for example, to the control unit 4 of FIG. 1 to be processed. The pressure sensor may be supplied via further electrical contact pads (not illustrated) or via the inductors 106, 109 in a known way.

Figure 11:
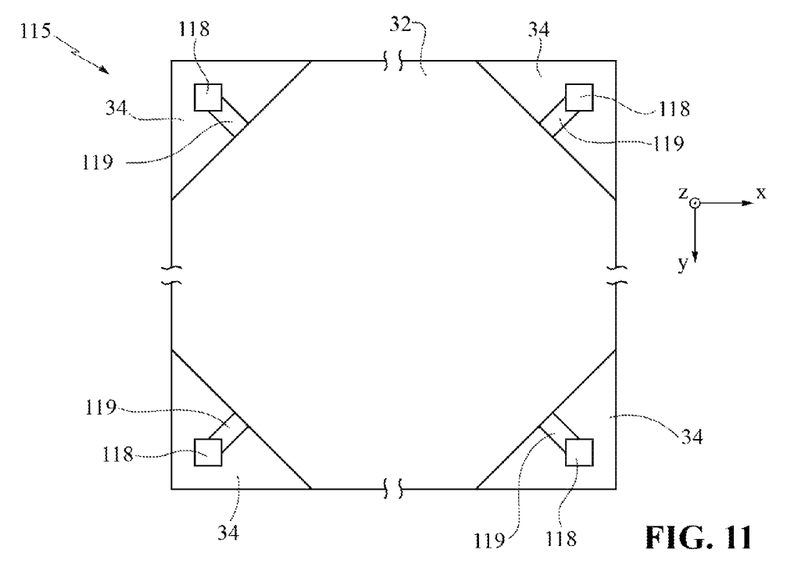

FIG. 11 shows, in top view, a further embodiment of a pressure sensor 115 where the first substrate 32 has an extension, in the plane XY, smaller than the respective extension of the monolithic body 16. In particular, the first substrate 32 is here modelled in such a way as to expose selective portions of the surface of the interface layer 34 that extends over the monolithic body 16. The exposed selective portions are corner regions of the interface layer 34 that extends over the monolithic body 16 (here assumed as being quadrangular, in particular square). Extending in the area corresponding to the exposed regions of the interface layer 34 is a plurality of contact pads 118 of conductive material, designed to be electrically contacted, for example by metal strips 119 (e.g., copper strips). The contact pads 118 are in turn in electrical contact with respective terminals of the circuits that comprise the first and second piezoresistive elements 28 and 29 for acquiring the signal transduced by them. Further electrical contact pads (not illustrated) may be provided for sending the power supply to the pressure sensor.

Figure 12:
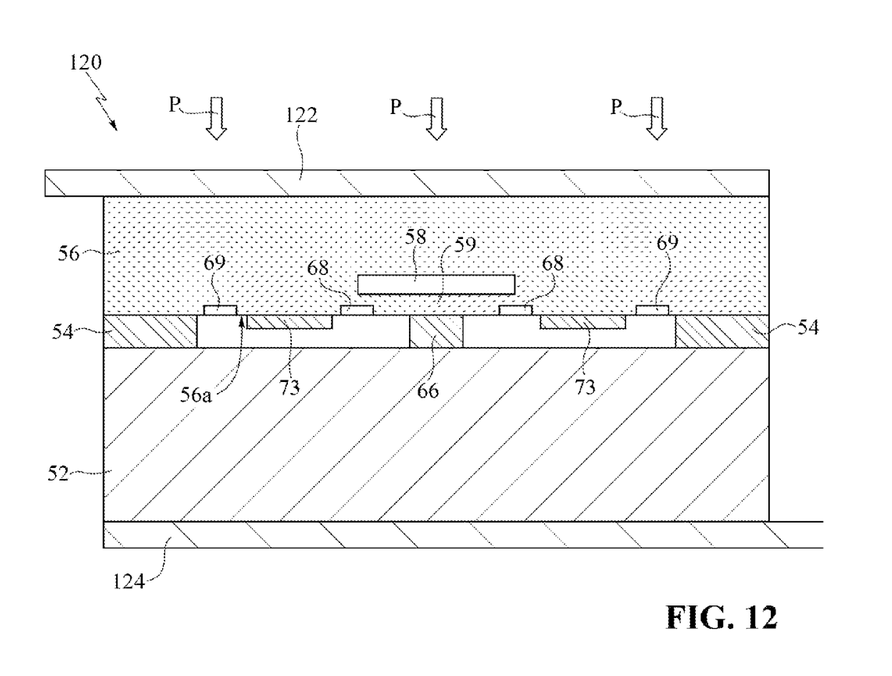

FIG. 12 shows a further embodiment of a pressure sensor 120. The pressure sensor 120 of FIG. 12 is similar to the pressure sensor 50 of FIG. 5. Elements of the pressure sensor 120 and of the pressure sensor 50 that are in common are here not described or illustrated any further and are designated by the same reference numbers.

The pressure sensor 120 further comprises a first blade connector 122 and a second blade connector 124 (also known as "fastons"); the first blade connector 122 extends over the exposed side of the monolithic body 56, whereas the second blade connector 124 extends over the exposed side of the base substrate 52. In this way, the monolithic body 56 and the base substrate 52 are sandwiched between the first and second blade connectors 122, 124.

The first and second blade connectors 122, 124, which are made of conductive material, in particular metal, have the function of sending the power supply to the pressure sensor 120. For instance, the first blade connector 122 is biased at a supply voltage $V_{DD}$, whereas the second blade connector 124 is biased at a reference voltage, for example the ground voltage GND. For this purpose, in the coupling regions between the monolithic body 56 and the first blade connector 122, and in the coupling regions between the base substrate 52 and the second blade connector 124, there extend respective electrical contact pads (not illustrated). In order to connect the second blade connector 124 electrically to the circuits (not illustrated, which comprise or are connected to the piezoresistive sensing elements 68, 69) in the monolithic body 56, it is necessary for at least one portion (for example, the outer ring) of the anchorage elements 54 to be conductive. Furthermore, the base substrate 52 and the monolithic body 56 must present a low resistivity.

According to one embodiment of the present disclosure, the first and second blade connectors 122, 124 further have the function of sending the signals transduced by the piezoresistive sensing elements 68, 69 outside the pressure sensor 120, for example to the control unit 4 of FIG. 1. In this case, according to techniques in themselves known, the electrical carrier signal (supply signal) is modulated in such a way as to function as data-carrying medium, for carrying also the signal transduced by the piezoresistive elements 68, 69 (signal at output, for example, from the respective Wheatstone-bridge circuits), or else said supply signal may be a constant voltage, superimposed then on which is a digital signal that carries the information of the physical quantity measured.

The pressure sensor described, according to the respective embodiments, presents numerous advantages.

In the first place, it presents a high full-scale value and enables measurement of pressures with a double measuring scale, a first scale for measuring low pressures, and a second scale for measuring high pressures. Both measurements are made with high precision. In particular, the pressure sensor described integrates within a same monolithic body of semiconductor material the elements sensitive to high and low pressures, with contained costs and limited complexity of production.

The pressure sensor makes a measurement of a differential type between one or more sensing elements and one or more piezoresistive reference elements and is consequently insensitive to variations of environmental parameters or to process spread.

Finally, it is clear that modifications and variations may be made to what has been described and illustrated herein, without thereby departing from the scope of the present disclosure.

In particular, it is clear how the shape of the monolithic body may be different from what has been described and illustrated. In particular, the cross-section of the monolithic body may be circular or generally polygonal, instead of being quadrangular or square as described. Also the first cavity 18 may have a shape different from what has been illustrated, for example a circular or generically polygonal cross-section. Likewise, also the second cavity 38 may have a shape different from what has been illustrated, for example a circular or generically polygonal cross-section.

Irrespective of the particular embodiment described, the piezoresistive sensor elements could be obtained using ion-implantation techniques, instead of by diffusion.

Irrespective of the particular embodiment described, it is possible to use electrical connections, between the piezoresistive elements, different from the Wheatstone bridge, for example a ring oscillator circuit, or some other connection still.

It is likewise possible to use a single piezoresistive sensing element for detecting deflections of the first membrane during the first operating condition, and a further single piezoresistive sensing element for detecting deflections of the second membrane (monolithic body) during the second operating condition of the pressure sensor.

Irrespective of the particular embodiment described, further, the piezoresistive elements may be located in a position different from the one illustrated.

Irrespective of the particular embodiment described, it is further possible to form, for example within the first substrate or the second substrate, an electronic measuring circuit, so as to provide a pressure measuring device integrated in a single die.

In addition, the focusing regions and the anchorage regions could be obtained also using non-dielectric material, for example conductive material or semiconductor material.

Furthermore, using a semiconductor material different from silicon, for example gallium arsenide, the sensing elements could have piezoelectric characteristics instead of piezoresistive ones.

Finally, it is pointed out that the pressure sensor 15 may advantageously be used also in other applications to measure high pressure values with a double measuring scale.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A pressure sensor with double measuring scale, configured to receive a pressure acting in a direction, comprising:
   a flexible body configured to undergo, at least in part, deflection as a function of said pressure;
   a first substrate arranged facing a first side of the flexible body;
   a transduction assembly configured to generate a first output signal and a second output signal as a function of deflections of respective first and second portions of the flexible body;
   a first focusing region arranged between the first substrate and the flexible body and configured to concentrate, during a first operating condition, a first pressure value of said pressure in the first portion of the flexible body and generate a deflection of only the first portion of the flexible body; and
   a second focusing region arranged between the first substrate and the flexible body and configured to concentrate, during a second operating condition, a second pressure value of said pressure in a second portion of the flexible body and generate a deflection of the second portion of the flexible body,
   the transduction assembly being configured to generate the first output signal during the first operating condition by correlating the deflection of the first portion of the flexible body to the first pressure value, and to generate the second output signal during the second operating condition by correlating the deflection of the second portion of the flexible body to the second pressure value.

2. The pressure sensor according to claim 1, further comprising a cavity between the first substrate and the flexible body, wherein the first focusing region extends in the cavity and has a first thickness equal to a distance existing between the first substrate and the flexible body, and the second focusing region extends in the cavity and has a second thickness smaller than said first thickness.

3. The pressure sensor according to claim 1, wherein:
   the second focusing regions protrude from the first substrate and surround, at least in part, the first focusing region, and
   the first substrate is configured to undergo deflection in the direction of application of the pressure, and
   the second focusing regions are configured to trigger passage from the first operating condition to the second operating condition by contacting the flexible body.

4. The pressure sensor according to claim 1, further comprising:
   a second substrate facing a second side, opposite to the first side, of the flexible body; and
   spacers extending between the second substrate and the flexible body, defining a cavity, on which the flexible body is suspended, so that the flexible body forms a membrane configured to undergo deflection during the second operating condition.

5. The pressure sensor according to claim 1, further comprising a buried first cavity extending within said flexible body, directly facing the first portion of the flexible body in such a way that the first portion of the flexible body extends suspended on the buried first cavity to form a membrane.

6. The pressure sensor according to claim 5, further comprising a second cavity between the first substrate and the flexible body, wherein the first focusing region extends in the second cavity and has a first thickness equal to a distance existing between the first substrate and the flexible body, and the second focusing region extends in the second cavity and has a second thickness smaller than said first thickness, wherein the thickness of the second focusing regions in said direction, and a dimension of the buried first cavity in said direction, are chosen in such a way that the membrane comes into contact with a bottom of the buried first cavity upon contact between the second focusing regions and the flexible body.

7. The pressure sensor according to claim 6, wherein the dimension of the buried first cavity in the direction of action of the pressure is equal to a corresponding dimension of the second cavity at the second focusing regions.

8. The pressure sensor according to claim 5, wherein said transduction assembly comprises first piezoresistive elements arranged, at least in part, in said membrane.

9. The pressure sensor according to claim 5, wherein said transduction assembly further comprises second piezoresistive elements arranged in the second portion of the flexible body, outside said membrane.

10. The pressure sensor according to claim 9, wherein said second portion of the flexible body that houses the second piezoresistive elements is a solid and compact region of the flexible body.

11. The pressure sensor according to claim 9, wherein the first piezoresistive elements are electrically connected together in a first Wheatstone-bridge circuit, or a first ring oscillator circuit, configured to supply the first output signal; and the second piezoresistive elements are electrically connected together in a second Wheatstone-bridge circuit, or a second ring oscillator circuit, configured to supply the second output signal.

12. The pressure sensor according to claim 5, wherein the membrane has a thickness in the direction of action of the pressure between 1 μm and 60 μm.

13. The pressure sensor according to claim 1, wherein said first pressure value is smaller than the second pressure value, in particular the first pressure value is in a range 0-20 N, and said second pressure value is higher than 20 N.

14. The pressure sensor according to claim 1, wherein the flexible body includes:
   a monolithic region having a thickness at the second portion along the direction of action of the pressure, between 50 μm and 900 μm; and
   an interface layer, extending between the monolithic region and the first and second focusing regions, configured to distribute said pressure uniformly over said monolithic region.

15. The pressure sensor according to claim 1, further comprising a communication interface configured to enable communication of the first output signal and/or second output signal to an external read circuit, the communication interface including a first inductor winding integrated in the flexible body and a second inductor winding integrated in the first substrate.

16. The pressure sensor according to claim 1, further comprising a first winding integrated in the flexible body and configured to inductively couple with a second winding of a printed-circuit board external to said pressure sensor, to form a interface for communication of the first output signal and/or the second output signal to said printed circuit board.

17. A pressure measuring device, comprising:
   a measuring circuit; and
   a sensor assembly electrically coupled to the measuring circuit and including a pressure sensor with double measuring scale, the pressure sensor being configured to receive a pressure acting in a direction and including:
     a flexible body configured to undergo, at least in part, deflection as a function of said pressure;
     a first substrate arranged facing a first side of the flexible body;
     a transduction assembly configured to generate a first output signal and a second output signal as a function of deflections of respective first and second portions of the flexible body;
     a first focusing region arranged between the first substrate and the flexible body and configured to concentrate, during a first operating condition, a first pressure value of said pressure in the first portion of the flexible body and generate a deflection of only the first portion of the flexible body; and
     a second focusing region arranged between the first substrate and the flexible body and configured to concentrate, during a second operating condition, a second pressure value of said pressure in a second portion of the flexible body and generate a deflection of the second portion of the flexible body,
   the transduction assembly being configured to generate the first output signal during the first operating condition by correlating the deflection of the first portion of the flexible body to the first pressure value, and to generate the second output signal during the second operating condition by correlating the deflection of the second portion of the flexible body to the second pressure value.

18. The device according to claim 17, wherein said measuring circuit is integrated in the flexible body of the pressure sensor.

19. A system, comprising:
   a pressure actuator configured to produce a pressure acting in a direction; and
   a pressure measuring device that includes a measuring circuit and a pressure sensor with double measuring scale, the pressure sensor being configured to receive the pressure acting in the direction and including:
     a flexible body configured to undergo, at least in part, deflection as a function of said pressure;
     a first substrate arranged facing a first side of the flexible body;
     a transduction assembly configured to generate a first output signal and a second output signal as a function of deflections of respective first and second portions of the flexible body;
     a first focusing region arranged between the first substrate and the flexible body and configured to concentrate, during a first operating condition, a first pressure value of said pressure in the first portion of the flexible body and generate a deflection of only the first portion of the flexible body; and
     a second focusing region arranged between the first substrate and the flexible body and configured to concentrate, during a second operating condition, a second pressure value of said pressure in a second portion of the flexible body and generate a deflection of the second portion of the flexible body,
   the transduction assembly being configured to generate the first output signal during the first operating condition by correlating the deflection of the first portion of the flexible body to the first pressure value, and to generate the second output signal during the second operating condition by correlating the deflection of the second portion of the flexible body to the second pressure value.

20. The system according to claim 19, comprising:
   a brake, wherein the measuring circuit is configured to generate a control signal and the pressure actuator includes an electromechanical actuator configured to exert a braking action on said brake in response to the control signal generated by the measuring circuit.

21. A method, comprising:

measuring a pressure by a pressure sensor with double measuring scale provided with: a flexible body configured to undergo, at least in part, deflection as a function of said pressure; a first substrate arranged facing a first side of the flexible body; a transduction assembly configured to generate a first output signal and a second output signal as a function of the deflection of the flexible body; a first focusing region; and a second focusing region, the measuring including:

applying, during a first operating condition, a first pressure value of said pressure to said pressure sensor;

concentrating, through the first focusing region, the first pressure value at a first portion of the flexible body and generate a deflection of the first portion of the flexible body;

applying, during a second operating condition, a second pressure value of said pressure to said pressure sensor;

concentrating, through the second focusing region, the second pressure value at a second portion of the flexible body and generate a deflection of the second portion of the flexible body;

correlating, by the transduction assembly, the deflection of the first portion of the flexible body to the first pressure value during the first operating condition;

generating, the first output signal as a function of the deflection of the first portion of the flexible body;

correlating, by the transduction assembly, the deflection of the second portion of the flexible body to the second pressure value during the second operating condition; and generating, the second output signal as a function of the deflection of the second portion of the flexible body.

22. The method according to claim 21, wherein the pressure sensor further comprises a first cavity, between the first substrate and the flexible body; and a buried second cavity, in said flexible body, that directly faces the first portion of the flexible body in such a way that the first portion of the flexible body extends suspended on the buried second cavity to form a first membrane, the method further comprising passing from the first operating condition to the second operating condition at a pressure value of said pressure that brings the first membrane into contact with a bottom of the buried pressure cavity.

23. The method according to claim 21, wherein:

the pressure sensor further comprises: a second substrate facing a second side, opposite to the first side, of the flexible body; and spacers extending between the second substrate and the flexible body, which define a third cavity, the flexible body being suspended over the third cavity so as to form a second membrane, concentrating the second value of said pressure in the second portion of the flexible body includes causing a deflection of the flexible body towards an inside of the third cavity.

* * * * *